United States Patent
Gupta et al.

(10) Patent No.: US 12,354,202 B1
(45) Date of Patent: Jul. 8, 2025

(54) GENERATIVE ADVERSARIAL NETWORKS

(71) Applicant: Deep Media, Inc., Oakland, CA (US)

(72) Inventors: Rijul Gupta, Oakland, CA (US); Emma Brown, Portland, OR (US)

(73) Assignee: Deep Media Inc., Oakland, CA (US)

( * ) Notice: Subject to any disclaimer, the term of this patent is extended or adjusted under 35 U.S.C. 154(b) by 240 days.

(21) Appl. No.: 17/960,268

(22) Filed: Oct. 5, 2022

Related U.S. Application Data

(60) Provisional application No. 63/252,387, filed on Oct. 5, 2021.

(51) Int. Cl.
  *G06T 13/80* (2011.01)
  *G10L 21/013* (2013.01)
  (Continued)

(52) U.S. Cl.
  CPC .......... *G06T 13/80* (2013.01); *G10L 21/013* (2013.01); *G10L 21/0208* (2013.01);
  (Continued)

(58) Field of Classification Search
  None
  See application file for complete search history.

(56) References Cited

U.S. PATENT DOCUMENTS

2021/0056348 A1 * 2/2021 Berlin ............... G06T 11/60
2023/0049729 A1 * 2/2023 Berlin ............... G06T 11/00

OTHER PUBLICATIONS

Dipanjan Das, Sandika Biswas, Sanjana Sinha, Brojeshwar Bhowmick, "Speech-Driven Facial Animation Using Cascaded GANs for Learning of Motion and Texture", 2020, Computer Vision ECCV 2020, Lecture Notes in Computer Science 12375, 408-424 (Year: 2020).*

(Continued)

*Primary Examiner* — Michael J Cobb
(74) *Attorney, Agent, or Firm* — Nicholas Pfeifer; Smith & Hopen, P. A.

(57) ABSTRACT

An audio-driven lip reanimation GAN network and method of reanimating lips based on an input audio using a GAN network. The GAN network includes a $1^{st}$ stage GAN generator configured to receive $1^{st}$ stage audio inputs and $1^{st}$ stage input frames. The $1^{st}$ stage GAN generator is trained to produce $1^{st}$ stage synthetic output frames in which a pair of lips in a target face in the $1^{st}$ stage synthetic output frames has been reanimated in reference to the $1^{st}$ stage input frames based on the $1^{st}$ stage audio inputs. The GAN network also includes a $2^{nd}$ stage GAN generator configured to receive the $1^{st}$ stage synthetic output frames as inputs. The $2^{nd}$ stage GAN generator is trained to generate $2^{nd}$ stage output frames that improve on the realism of the $1^{st}$ stage output frames.

18 Claims, 5 Drawing Sheets

(51) Int. Cl.
    *G10L 21/0208*    (2013.01)
    *G10L 21/0272*    (2013.01)
    *G10L 21/0356*    (2013.01)
    *G10L 25/30*      (2013.01)

(52) U.S. Cl.
    CPC ...... *G10L 21/0272* (2013.01); *G10L 21/0356* (2013.01); *G10L 25/30* (2013.01); *G10L 2021/0135* (2013.01)

(56) References Cited

OTHER PUBLICATIONS

Hamaza Bouzid, "Facial Expression Video Generation Based-on Spatio-Temporal Convolutional GAN: FEV-GAN", 2022, Intelligent Systems with Applications, 16:200139, pp. 1-11 (Year: 2022).*

Longhao Zhang et al. "AP-GAN: Improving Attribute Preservation in Video Face Swapping", Jun. 2021, IEEE Transactions on Circuits and Systems for Video Technology, 32(4):2226-2237 (Year: 2021).*

Yujun Shen, Bolei Zhouu, Ping Luo, Xiaoou Tang, "FaceFeat-GAN: A Two-Stage Approach for Identity-Preserving Face Synthesis", arXiv:1812.01288v1, pp. 1-12 (Year: 2018).*

Xiong Li, Jiye Zhang, Yazhi Liu, "Speech Driven Facial Animation Generation based on GAN", 2022, Displays 74:102260, pp. 1-8 (Year: 2022).*

* cited by examiner

GENERATIVE ADVERSARIAL NETWORKS

CROSS-REFERENCE TO RELATED APPLICATIONS

This nonprovisional application claims priority to provisional application No. 63/252,387, entitled "HIGH-ACCURACY, FULL-RESOLUTION, ROBUST, LIP-REANIMATION ON UNSEEN IDENTITIES USING GENERATIVE ADVERSARIAL NETWORKS," filed Oct. 5, 2021 by the same inventors.

BACKGROUND OF THE INVENTION

1. Field of the Invention

This invention relates, generally, to lip-reanimation. More specifically, it relates to high-accuracy, full-resolution, robust, lip-reanimation on unseen identities using generative adversarial networks.

2. Brief Description of the Prior Art

Generative adversarial networks (GANs) have become a popular tool for creating synthetic or "fake" media. GANs are a form of machine learning in which a generator attempts to create synthetic images that are sufficiently real to trick a discriminator into identifying the synthetic image as a real image. In order to succeed, the generator often needs to be trained on real images for a lengthy period of time. In addition, most generators need to be trained on a particular individual in order to ensure that it can create a synthetic image of that individual that is sufficiently real to trick the generator.

However, the extensive training is time consuming and expensive. Thus, there has been a push to create GAN generators that do not need to be trained on a particular individual to create a synthetic image based on that individual. Such generators are referred to as one shot GAN generators and the GAN itself is referred to as a one shot GAN.

Wav2Lip is an example of a one shot GAN. However, Wav2Lip produces low-accuracy, low-resolution, non-robust, lip-reanimations for unseen identities. Like all existing one shot GANs, Wave2Lip suffers from many issues preventing the system from producing realistic synthetic images.

Accordingly, what is needed is an improved GAN-based system that can produce more realistic synthetic media. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved GAN-based system that can produce more realistic synthetic media is now met by a new, useful, and nonobvious invention.

The present invention includes an improved audio-driven lip reanimation GAN network and an improved method of reanimating lips based on an input audio using a GAN network. The GAN network includes a 1st stage GAN generator configured to receive 1st stage audio inputs and 1st stage input frames. In addition, the 1st stage GAN generator is pre-trained to produce 1st stage synthetic output frames in which a pair of lips in a target face in the 1st stage synthetic output frames has been reanimated in reference to the 1st stage input frames based on the 1st stage audio inputs.

The GAN network also includes a 2nd stage GAN generator configured to receive the 1st stage synthetic output frames as inputs. The 2nd stage GAN generator is pre-trained to generate 2nd stage output frames in which at least some artifacts are removed in comparison to the 1st stage output frames, facial identity maintenance is improved in comparison to the 1st stage output frames, and temporal consistency is improved across a series of successive frames in comparison to the 1st stage output frames.

In some embodiments, the 1st stage GAN generator is pre-trained on 1st stage audio inputs and 1st stage input frames comprised of a sequential set of modified ground truth frames and a set of unaltered ground truth frames. The modified ground truth input frames include at least a mouth portion of the target face in each frame masked out. Moreover, the 1st stage GAN generator is pre-trained through backpropagating a calculated loss of at least one 1st stage discriminator, wherein the calculated loss is based on a comparison of the 1st stage synthetic output frames with the unaltered ground truth frames.

In some embodiments, the 1st stage discriminators includes a facial identification discriminator configured to calculate a loss of facial identification between the target face in the 1st stage synthetic output frames and the unaltered ground truth frames based on a facial identification loss function and a lip sync discriminator configured to calculate a loss of lip syncing between the target face in the 1st stage synthetic output frames and the 1st stage audio inputs.

The 2nd stage GAN generator is pre-trained on 2nd stage input frames, which can be comprised of the 1st stage synthetic output frames. Moreover, the 2nd stage GAN generator is pre-trained through backpropagating a calculated loss of at least one 2nd stage discriminator, wherein the calculated loss is based on a comparison of the 2nd stage synthetic output frames with the unaltered ground truth frames. In some embodiments, the 2nd stage discriminators include a facial identification discriminator configured to calculate a loss of facial identification between the target face in the 2nd stage synthetic output frames and the unaltered ground truth frames based on a facial identification loss function; a visual quality discriminator configured to calculate a loss of visual quality between the target face in the 2nd stage synthetic output frames and the unaltered ground truth frames based on a visual quality loss function; and a temporal consistency discriminator configured to calculate a loss of temporal consistency between the target face in the 2nd stage synthetic output frames and the unaltered ground truth frames based on a temporal consistency loss function.

In some embodiments, the 1st stage GAN generator is further pre-trained through a series of steps. Those steps include identifying facial landmarks on the ground truth frames and on the 1st stage synthetic output frames. The identified facial landmarks include facial landmarks around a jaw and a mouth. The training steps also include masking the ground truth frames and the synthetic output frames to hide the target face except for a jaw portion of the target face and calculating facial landmark loss for the facial landmarks for the jaw. In addition, the ground truth frames and the synthetic output frames are masked to hide the target face except for a mouth portion of the target face and facial landmark loss is calculated for the facial landmarks for the mouth. Finally, the calculated facial landmark loss for the facial landmarks for the jaw and the calculated facial landmark loss for the facial landmarks for the mouth to the 1st stage GAN generator are backpropagated to the 1st stage GAN generator.

In some embodiments, the 1st stage GAN generator includes convolutional layers to convolve images at a resolution greater than 96×96×3FPI. In some embodiments, the 1st stage GAN generator includes deconvolution layers up to 96×96×3FPI and then uses resizing algorithms to expand image resolution beyond 96×96×3FPI.

In some embodiments, the 1st stage audio inputs are filtered to separate speakers, remove background noise, and normalize vocal volume. In some embodiments, the 1st stage audio inputs for training the 1st stage GAN include augmented audio inputs. The augmented audio inputs including the 1st stage audio inputs with an altered pitch.

In some embodiments, the input frames are cropped and aligned to bring the target face in each frame into the same orientation and a frame per second rate of the input frames is downscaled from an original frame per second rate after cropped and aligned, but prior to being provided to the 1st stage GAN generator. In addition, the 1st stage synthetic output frames are upscaled to the original frame per second rate prior to being input into the 2nd stage GAN generator.

Some embodiments of the GAN network further include an output frame processor. The output frame processor is configured to perform the steps of: inserting a series of triangles connecting facial landmarks on the 2nd stage synthetic output frames; inserting a series of triangles connecting facial landmarks on the 1st stage input frames, wherein each triangle on the 1st stage input frames has a corresponding triangle on the 2nd stage synthetic output frames comprised of the same facial landmarks; masking the 2nd stage synthetic output frames to include only triangles corresponding to a mouth portion of the 2nd stage synthetic output frames; and moving a location of one or more of the series of triangles on the 1st stage input frames to coincide with the locations of the corresponding triangles on the masked 2nd stage synthetic output frames, wherein a set of pixels within the one or more moved triangles moves with the moved triangle. The output frame processor further executes the steps of inputting texture from the 1st stage input frames onto the pixels within the triangles in the masked 2nd stage synthetic output frames.

Some embodiments of the GAN network further include further include a reinsertion module. The reinsertion module is configured to reinsert the at least a lower portion of the target face from each of the 2nd stage synthetic output frames back into the original input frames.

The method of reanimating lips based on an input audio using a GAN network includes the system and steps described above and herein. More specifically, the method includes receiving, by a 1st stage GAN generator, 1st stage audio inputs and 1st stage input frames. Again, the 1st stage GAN generator is pre-trained to produce 1st stage synthetic output frames based on the 1st stage audio inputs, whereby the 1st stage synthetic output frames include a pair of reanimated lips in a target face in the 1st stage synthetic output frames in reference to the 1st stage input frames.

The method further includes receiving, by a 2nd stage GAN generator, the 1st stage synthetic output frames as inputs. The 2nd stage GAN generator is pre-trained to generate 2nd stage output frames in which at least some artifacts are removed in comparison to the 1st stage output frames, facial identity maintenance is improved in comparison to the 1st stage output frames, and temporal consistency is improved across a series of successive frames in comparison to the 1st stage output frames.

Some embodiments further including training the 1st stage GAN generator. The training steps include inputting 1st stage audio inputs and 1st stage input frames comprised of a sequential set of modified ground truth frames and a set of unaltered ground truth frames, the modified ground truth input frames including at least a mouth portion of the target face in each frame masked out; backpropagating a pixel loss between the target face in the 1st stage synthetic output frames and the unaltered ground truth frames based on an L1 loss function; backpropagating a calculated loss of facial identification between the target face in the 1st stage synthetic output frames and the unaltered ground truth frames based on a facial identification loss function; and backpropagating a calculated loss of lip syncing between the target face in the 1st stage synthetic output frames and the 1st stage audio inputs.

Some embodiments further training the 2nd stage GAN generator. The training steps include backpropagating a calculated loss of pixel loss between the target face in the 2nd stage synthetic output frames and the unaltered ground truth frames based on an L1 loss function; backpropagating a calculated loss of facial identification between the target face in the 2nd stage synthetic output frames and the unaltered ground truth frames based on a facial identification loss function; backpropagating a calculated loss of visual quality between the target face in the 2nd stage synthetic output frames and the unaltered ground truth frames based on a visual quality loss function; and backpropagating a calculated loss of temporal consistency between the target face in the 2nd stage synthetic output frames and the unaltered ground truth frames based on a temporal consistency loss function.

The method also includes reinserting at least a lower portion of the target face from each of the 2nd stage synthetic output frames back into the original input frames.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
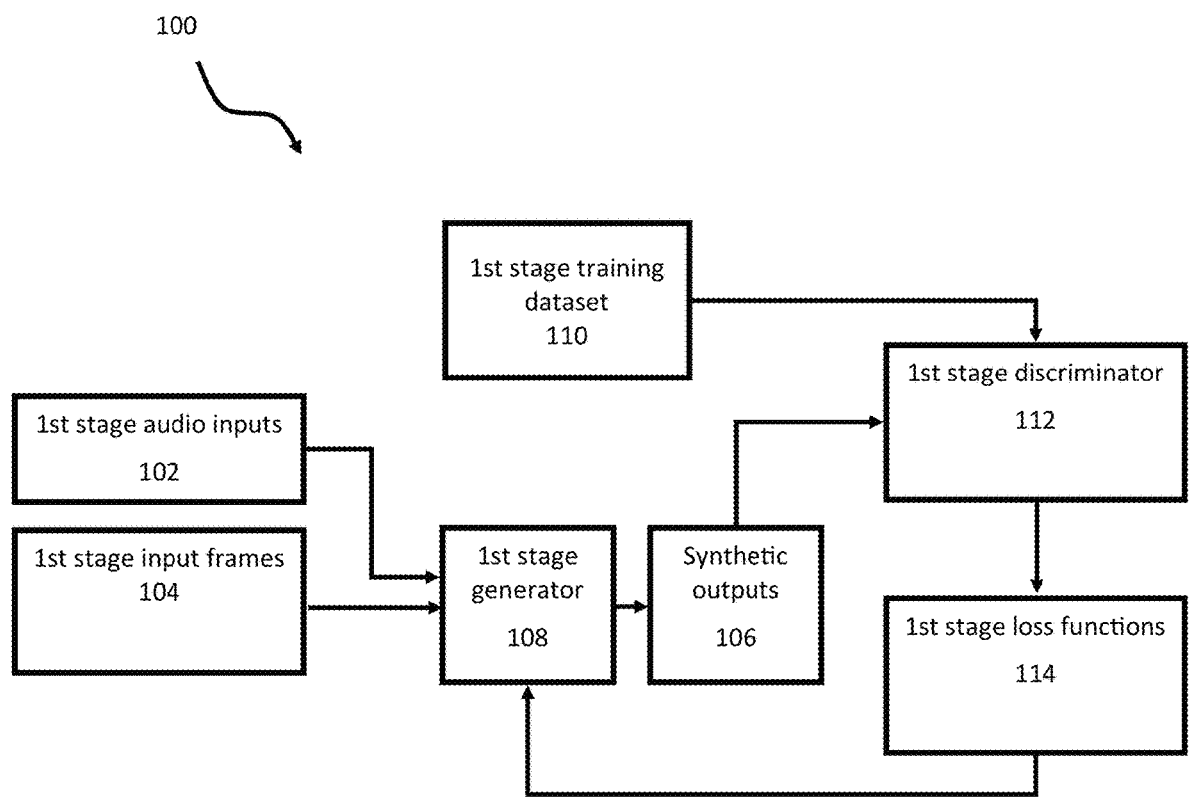
FIG. 1 is a block diagram of an embodiment of a 1st stage GAN.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention includes a GAN-based system and methods configured to produce a more realistic synthetic image than the prior art. The system and methods described herein are good for one-shot manipulation, but will also produce better outputs than the prior art when the system is trained or tuned on a particular person.

GAN Stacking

An embodiment of the present invention includes a stacked GAN network, which produces better results than non-stacked GANs. GAN stacking can improve synthetic media by increasing resolution or removing artifacts in comparison to other non-stacking approaches. Currently, prior art GAN networks are trained so that the generator can successfully alter or create various synthetic features until the discriminator is unable to determine that the synthetic outputs of the generator are not real images. After this training period, the generator is ready for use in creating synthetic output media, which is often referred to as inference. However, the synthetic outputs can include artifacts, are in low resolution, and can include identity loss and temporal inconsistencies across sequential frames.

Figure 2:
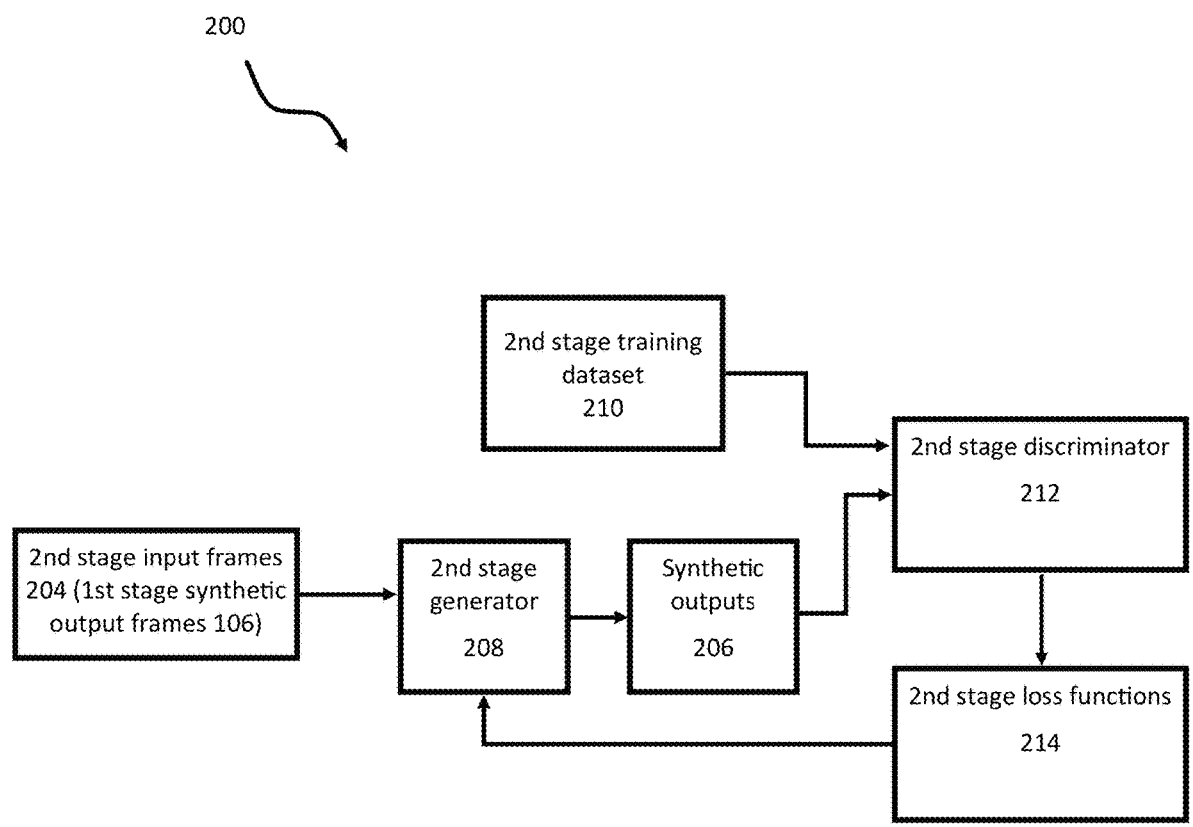
FIG. 2 is a block diagram of an embodiment of a 2nd stage GAN.
Figure 3:
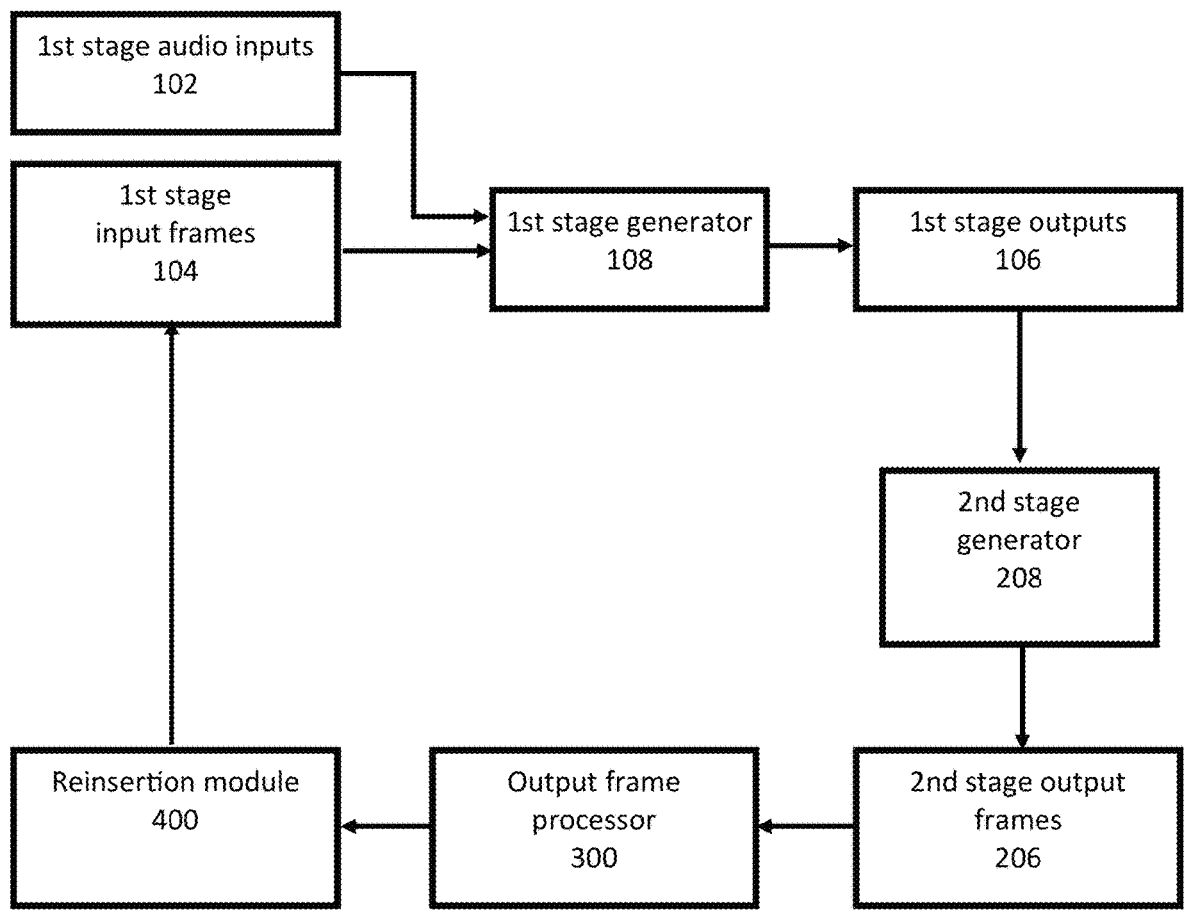
FIG. 3 is a block diagram of an embodiment of GAN stacking.

The present invention includes a GAN network comprised of a multi-stage GAN arrangement as depicted in FIGS. 1-3. Using multiple successive GANs with each successive GAN using the synthetic image output from the previous generator as input for the next successive generator will improve the overall synthetic outputs of the network when the successive GAN generators are properly trained and configured to improve resolution of the $1^{st}$ stage output, maintain identity of the face, and/or maintain the temporal consistency across sequential frames.

In order to ensure that the GAN-stacking network creates improved synthetic outputs, the $1^{st}$ stage and $2^{nd}$ stage GANs (and any subsequent GANS) require proper training data and proper inputs during inference to create more realistic synthetic output media. The $1^{st}$ stage GAN is configured to execute specific facial manipulations while the later stage GAN(s) are tasked with improving the realism of the output of the $1^{st}$ stage generator. For example, the $1^{st}$ stage GAN generator is trained to create a synthetic output, such as a series of frames in which a target face includes lip reanimation to coincide with a translated audio file. Distinctly, the $2^{nd}$ stage GAN generator is trained to remove artifacts from the output of the $1^{st}$ stage generator and maintain identity and temporal consistency across a series of successive frames.

1st Stage GAN Training

Referring now to FIG. 1, 1st stage GAN 100 is tasked with producing synthetic output media 106. Audio inputs 102 and input frames 104 and are provided to 1st stage generator 108, which are used to produce synthetic outputs 106. Synthetic output media 106 can include facial and/or audio manipulation. For example, 1st stage GAN generator 108 can be a trained system configured to produce synthetic frames (the sequence of which makes a video or part of a video) in which a target face's lip movement's coincide with a translated audio file provided during inference.

The 1st stage GAN 100 is trained using 1st stage training dataset 110. During training, dataset 110 is provided to one or more 1st stage discriminators 112 along with synthetic outputs 106 from 1st stage generator 108. Each of the 1st stage discriminators 112 are configured to identify the media from dataset 110 and synthetic media 106 from 1st stage generator 108 as either real or fake (i.e., synthetic) media. In addition, each 1st stage discriminator 112 calculates one or more loss functions 114 and shares the data with 1st stage generator 108. Based on the loss functions, 1st stage generator 108 alters features/variables to produce alternative synthetic media 106 and continues until each of the 1st stage discriminators 112 can no longer differentiate synthetic output media 106 from 1st stage generator 108 as fake media.

The 1st stage GAN 100 preferably includes a multitude of 1st stage discriminators 112. In some embodiments, 1st stage discriminators 112 are specifically tasked with calculating loss through unique loss functions tasked with teaching 1st stage generator 108 to reanimate lips based on an audio file. These discriminators can include but are not limited to a lip sync discriminator(s) and ID discriminators. The 1st stage GAN 100 may also include an L1 loss function to calculate pixel-based losses in comparison to the ground truths, however, this loss function is not necessarily a discriminator.

Lip sync discriminators can include known trained lip sync discriminators including but not limited to SyncNet, Multi-View SyncNet, SimCLR, ASDNet, VSD models, and AVSR models. ID discriminators can include known trained identity discriminators including but not limited to VGG-Face, ArcFace OpenFace, DeepFace, SFace, DeepID, and FaceNet. Regardless of the discriminator, each calculates loss via loss functions 114. The calculated loss is backpropagated to 1st stage generator 108, thereby allowing 1st stage generator 108 to alter the variables on synthetic outputs 106 in an attempt to create realistic synthetic output frames.

For lip sync discriminator(s) the loss function(s) calculate a loss of lip syncing between the target face in the 1st stage synthetic output frames and the 1st stage audio inputs. For ID discriminator(s) the loss function(s) calculate a loss of facial identification between the target face in the 1st stage synthetic output frames 106 and the unaltered ground truth frames.

The 1st stage training dataset 110 is comprised of paired datasets in the form of a collection of ground truth input frames with synced audio. As shown in FIG. 1, 1st stage discriminators 112 receives 1st stage training dataset 110 along with synthetic outputs 106 and calculates the 1st stage loss functions based on the comparison of synthetic outputs 106 with the ground truth input frames with synced audio.

During training, 1st stage generator 108 receives 1st stage input frames 104 and 1st stage audio inputs 102. The 1st stage audio inputs 102 are the synced audio corresponding to the ground truth frames. In addition, audio inputs 102 can be provided as a Mel Spectrogram or any other computer-readable format.

The 1st stage input frames 104 include a sequential set of frames from the ground truth input frames that have been modified and a set of unaltered, but different series of ground truth frames. The modified frames are altered to remove or obscure the portion of the face that is going to be reanimated by 1st stage generator 108. When lip reanimation is the task of 1st stage generator 108, the lower portion of the face with the lips is masked or cropped out and the upper halves of the frames remain visible. The 1st stage generator 108 uses inputs 102 and 104 to try to produce realistic synthetic output frames 106.

It should be noted that the ground truth frames and 1st stage input frames 104 are cropped and aligned (using e.g., FFHQ-align-big-which is an AI system configured to crop and align faces in successive frames) and then cropped again (using e.g., bounding-box-type—which is an AI system configured to crop faces) to adjust the size and orientation of the target face within each frame prior to inputting the frames into 1st stage generator 108 and/or 1st stage discriminators 112. The ground truth frames and 1st stage input frames 104 may also be resized to the necessary resolution as required by 1st stage generator 108 and/or 1st stage discriminators 112.

2nd Stage Training Data

Referring now to FIG. 2, 2nd stage GAN 200 is tasked with producing synthetic output media 206, which is an improved version of synthetic outputs 106 from 1st stage generator 108. To do so, the 1st stage outputs 106 are provided as inputs to 2nd stage generator 208. In some embodiments, the 2nd stage GAN generator 108 is a trained system configured to improve on 1st stage outputs 106 by removing artifacts from 1st stage outputs 106, maintaining identity across a series of successive frames, and maintaining temporal consistency across a series of successive frames.

The 2nd stage GAN 200 is trained using 2nd stage training dataset 210. During training, dataset 210 is provided to one or more 2nd stage discriminators 212 along with synthetic outputs 206 from 2nd stage generator 208. The 2nd stage discriminators 212 are configured to identify the media from dataset 210 and synthetic media 206 from 2nd stage generator 108 as either real or fake (i.e., synthetic) media. Each 2nd stage discriminator 212 is configured to calculate a loss from a loss function 214 and shares the data with 2nd stage generator 208. Based on the calculated loss, 2nd stage generator 208 alters features/variables to produce alternative synthetic media 206 and continues until 2nd stage discriminator 212 can no longer differentiate synthetic output media 206 from 2nd stage generator 208 as fake media.

The 2nd stage GAN 200 preferably includes a multitude of 2nd stage discriminators 212. In some embodiments, 2nd stage discriminators 212 are specifically tasked with calculating loss through unique loss functions tasked with teaching 2nd stage generator 208 to fine tune the outputs 206. These discriminators can include but are not limited to visual quality discriminator(s), face ID discriminator(s), and temporal consistency discriminator(s). The 2nd stage GAN 200 may also include an L1 loss function to calculate pixel-based losses in comparison to the ground truths, however, this loss function is not necessarily a discriminator.

Visual quality discriminators are configured to calculate a loss related to visual realism and resolution and can include known, trained discriminators (i.e., trained AI systems) including but not limited to DeepIQA, LPIPS, and DISTS. The visual quality discriminators compare visual quality between the target face in the 2nd stage synthetic output frames and the unaltered ground truth frames based on a visual quality loss function. In some embodiments, the trained visual quality discriminators above are retrained on face datasets.

Face ID discriminators can include known, trained identity discriminators including but not limited to VGG-Face, ArcFace OpenFace, DeepFace, SFace, DeepID, and FaceNet. The face ID discriminator(s) use loss function(s) to calculate a loss of facial identification between the target face in the $2^{nd}$ stage synthetic output frames 206 and the unaltered ground truth frames.

Temporal consistency discriminator(s) are configured to calculate a loss of temporal consistency between the target face in the $2^{nd}$ stage synthetic output frames and the unaltered ground truth frames and can include known, trained discriminators including but not limited to FlowNet, FlowNet2, MaskFlowNet, and FlowFormer. Temporal consistency discriminator(s) are pretrained AI systems that analyze the flow between a sequence of frames (at least 3). These pretrained AI system can be retrained on face data to work more effectively with lip reanimation.

Regardless of the discriminator, each discriminator calculates loss via loss functions 214. The calculated loss is backpropagated to $2^{nd}$ Stage generator 208, thereby allowing $2^{nd}$ stage generator 208 to alter the variables on synthetic outputs 206 in an attempt to remove artifacts from $1^{st}$ stage outputs 106, maintain identity across a series of successive frames from $1^{st}$ stage outputs 106, and maintain temporal consistency across a series of successive frames from $1^{st}$ stage outputs 106.

The particular loss functions are what allow $2^{nd}$ stage GAN 200 to assess the resolution, identity maintenance across a series of sequential frames, and flow maintenance for video consistency across a series of sequential frames.

For visual quality discriminator(s) the loss function(s) can include L1, L2, or cosine distance between the features created by the input image and the features created by ground image.

For face ID discriminator(s), the loss function(s) can include L1, L2, or cosine distance between the embedding or features created by the input image and the embedding or features created by the generated image.

For temporal consistency discriminator(s), the loss function(s) can include full scale or multiscale features or flow outputs created by the input image and the features or flow outputs created by the generated image.

The $2^{nd}$ stage training dataset 210 is comprised of a combination of the original ground truth frames from the $1^{st}$ stage and a collection of low resolution input frames with similar errors and inconsistencies that would be present in synthetic outputs 106. This training dataset 210 is intended to train $2^{nd}$ stage generator 208 to improve the resolution and remove the errors and inconsistencies that would be present in synthetic outputs 106. In some embodiments, the input frames in training data 210 are comprised of outputs from $1^{st}$ stage generator 108. However, input frames in training data 210 can include a collection of frames with manufactured degradations to mimic output frames 106.

Similar to the $1^{st}$ stage, the ground truths and input frames are preprocessed in the same manner as $1^{st}$ stage, but the cropping and aligned (also referred to as "CAP" in subsequent sections) is executed with FFHQ-align-big and then FFHQ-align-normal which is an AI system configured to crop and align faces in successive frames in a tighter crop in comparison to FFHQ-align-big) prior to being resized to the necessary resolution as required by $2^{nd}$ stage generator 208 and/or $2^{nd}$ stage discriminators 212.

Some embodiments of the present invention use first-stage training data (e.g., seen while training), or non-training data (e.g., not seen while training). Using non-training data is always better but generating cycle-reconstruction data with training data can produce good data for GAN-Stacking, especially when used as a technique for generating paired-data.

Cycle reconstruction data is data acquired from sending the original video with cycle offsets through inference to produce synthetic outputs that can be used as second stage training data. Consider the following example of cycle-reconstruction data starting with input data is a 5-second audio/video file: the system offsets the audio by ~0.5 seconds (or any range beyond 0.2 seconds), or uses audio from a different video of the same or different identity; runs the misaligned data through Wav2Lip to generate unpaired data; undoes the audio offset and sends this unpaired data through Wav2Lip again using the original audio. This generated paired data is referred to as "cycle-reconstruction data." The cycle-reconstruction technique is a good way to get paired or un-paired training data from either training data or non-training data.

$1^{st}$ Stage Inference

Figure 4:
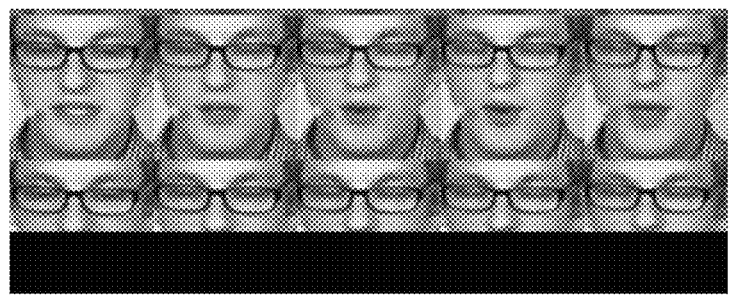
FIG. 4 is an example of a sequential set of 1st stage input frames with unaltered frames from the input video file shown in the upper row and a modified set of frames from the input video file with the lower portion of the face masked.

Referring now to FIG. 3, during inference, $1^{st}$ stage GAN generator 108 produces synthetic media 106 that often contains real-world artifacts, errors, etc. During inference, $1^{st}$ stage input audio 102 can be a translated audio file intended to be synced to an input video file. The input video file is provided as a series of sequential input frames. The $1^{st}$ stage input frames 104 include a sequential set of frames from the input video file that have been modified and a set of unaltered, but different series of frames from the input video file. The modified frames are altered to remove or obscure the portion of the face that is going to be reanimated by $1^{st}$ stage generator 108. When lip reanimation is the task of $1^{st}$ stage generator 108, the lower portion of the face with the lips is masked or cropped out and the upper halves of the frames remain visible as exemplified in FIG. 4. The series of sequential input frames can be between 3 and 11 successive frames. In some embodiments, the series of sequential input frames is 5 successive frames.

Referring back to FIG. 3, prior to being input to $1^{st}$ stage generator 108, the input frames are cropped to via a bounding box around a target face (speaking face intended to be reanimated) and a set of facial landmarks are used to orient the face in each frame into the same orientation. Facial landmarks are detected again on each of the aligned faces and the frames are again cropped and aligned. These frames are then ready for input into $1^{st}$ stage generator 108.

The $1^{st}$ stage generator 108 uses $1^{st}$ stage inputs 102 and 104 to try to produce realistic $1^{st}$ stage synthetic outputs 106. Synthetic output frames 106 include facial manipulation, but also come with issues, such as lower resolution, artifacts, face ID inconsistencies, and/or flow inconsistencies.

$2^{nd}$ Stage Inference

To correct these issues, $1^{st}$ stage synthetic outputs 106 are provided to $2^{nd}$ stage generator 208, which has been trained to remove these inconsistencies. The second-stage GAN is configured to try and make a specific synthetic output look completely real or at least more real in comparison to the $1^{st}$ stage outputs 106.

Prior to inputting $1^{st}$ stage outputs 106 into $2^{nd}$ stage generator 208, $1^{st}$ stage outputs 106 are cropped and aligned to capture the entire target face using for example FFHQ-align-big. Those cropped and aligned $1^{st}$ stage outputs 106 are then again cropped and aligned tighter using example FFHQ-align-normal to create 2$^{nd}$ stage inputs 204, which are formatted for insert into 2$^{nd}$ stage GAN generator 208.

Some embodiments of the present invention use more narrowly focused second stages/third stages/etc. that build on each other and/or optimize for different things. In some embodiments, such as a modified Wav2Lip implementation, the 2$^{nd}$ stage GAN may be a super-resolution network (e.g., ESRGAN, TecoGAN, iSeeBetter) or a facial restoration system (e.g., GFPGAN, or FaceFormer). In some embodiments, the 2$^{nd}$ stage generator can be a noise-reduction/noise-removal network and may optionally include StyleGAN2 embedding techniques. If set up properly, 2$^{nd}$ stage GANs lead to improvements in every single failure case across the board and reaches full realism at a certain resolution.

Some embodiments of the present invention use paired-data—e.g., any input image/video has an exact right output image/video. This means the present invention can use networks that expect paired data (e.g., super-resolution, Pix2Pix, Vid2Vid, noise reduction, etc.). The present invention can also use unpaired networks (e.g., CycleGAN, etc.). While obtaining paired-data for GAN-stacking can be difficult, it often leads to better results.

Overcoming Resolution Restrictions

Prior art GANs, such as Wav2Lip use input images having a resolution of 96×96 pixels and output a generated image having the same resolution. However, 96×96 is a non-optimum/non-standard image resolution. These prior art GANs include encodes and decodes configured to operate at this resolution. In addition, the convolutional pooling and stride length of the GANs are configured to handle a 96×96 image resolution.

In order to operate its GAN at a higher image resolution, e.g., 256 or 128 or even 64, the present invention includes additional layers, which allows the GANs to receive input frames of higher resolutions and output frames of higher resolutions. In addition, the GAN of the present invention includes convolutional pooling and stride length configured to work with addition layers.

In some embodiments, the present invention adds additional layers to the generator encoder and decoder networks to increase sizes. For example, 1 layer-final output is 128, 192, 256, etc. and 2 layers-final output is 192, 256, 512. Traditionally, adding additional layers adds additional complexity, making it more expensive to train, more unstable, and generally more difficult to get results that look better than lower resolution training. However, more layers on the networks helps the GANs to train to get stable and good results at resolutions greater than 96x96. Thus, embodiments of the present invention take certain approaches to adding additional layers while minimizing the negative consequences of doing so.

In some embodiments, the present invention adds additional layers by not performing deconvolution. Typically, deconvolution occurs in the decoding part of the network and is the opposite of convolution. Convolution produces a lower dimension (e.g., 96x48 to 48x24), and deconvolution produces a higher dimension (48x24 to 96x48). At a certain resolution, deconvolution was producing worse results. Instead of deconvolving, the present invention resizes the output image using known resizing techniques, including but not limited to bicubic, Lanczos, OpenCV, Numpy, PIL, C++, RawC. Resizing from 128-256 and 256-512 produced better results than deconvolving at these higher resolutions.

In some embodiments, the present invention performs deconvolution at lower layers (~96, 128, 192, 256) and performs resizing at higher layers (192, 256, 512, 1024). This can also be used to skip some layers—e.g., go straight from 96x96 to 512×512 with only one additional layer. This can also produce better results even when not adding new layers.

Some embodiments use coarse-to-fine training to add additional layers. Coarse-to-fine training through data augmentation includes starting training with downscaled data inputs, performing this training for a period of time and then performing training with the upscaled data. For example, if the GAN is a 256 network, start training on inputs that have been downscaled to 16×16 and then upscaled back to 256×256. After a pre-determined time, or when a certain loss metric is achieved, move on to 32×32 or 64×64. The data can continually increase in resolution until the data reaches the preferred network size (e.g., 256×256). This creates similar results to progressive training, but additional layers are not added over time. Rather, the architecture always had all of its layers (e.g., is at 256 or 512 or 1024 resolution) the entire time and only the data changes.

Some embodiments use feature encoding network to add additional layers like ArcFace (or any other facial embedding) and/or Learned Perceptual Quality (LPIPS) for audio-driven facial reanimation networks. "Features" are data points that are highly correlated to important information for the GAN. The present invention uses pre-trained feature encoding networks to determine whether the input features are sufficiently captured in the generated image. The additional layers provide another metric for testing how accurate the generator is creating synthetic images based on the input audio. These layer feature encoding networks can then back propagate the results to adjust the feature weights in the network and improve the output of the GAN.

Some embodiments modify the discriminator of an audio-driven facial reanimation network to overcome the resolution failures of the prior art. Prior art discriminators always adopt the structure of the generator. In contrast, the present invention often uses different discriminators to start with some of them being configured to receive inputs at different resolutions than the generator. Instead of modifying the discriminator architecture, the present invention resizes the outputs of the generator using a known resizing method. For example, the system can train an expert SyncNet or ASDNet or SimCLR at 96 or 128 or 256 or 160 and train the generator at 256 or 512 or 1024, and just resize the generator outputs "on-the-fly" to fit any discriminators. Typically, discriminators are unstable at higher resolution. Thus, resizing the generator outputs to the discriminator resolution works well.

Figure 5:
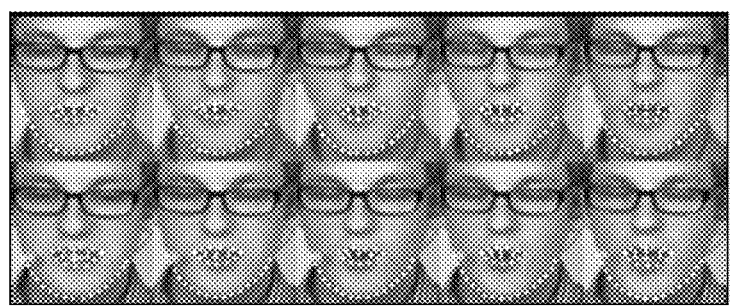
FIG. 5 is an example of facial landmark on a sequential set of 1st stage input frames in the upper row and on a sequential set of 1st stage synthetic output frames in the lower row.
Figure 6:
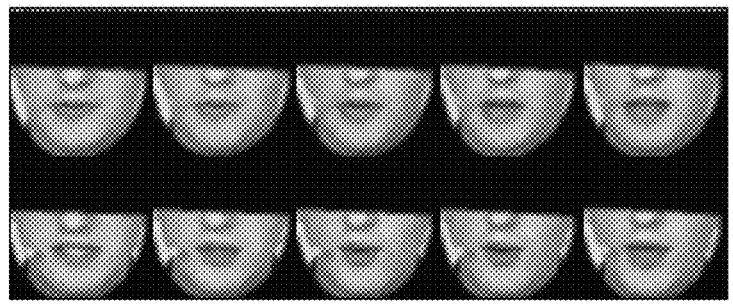
FIG. 6 is an example masking the jaw section of a sequential set of 1st stage input frames in the upper row and the jaw section of a sequential set of 1st stage synthetic output frames in the lower row.
Figure 7:
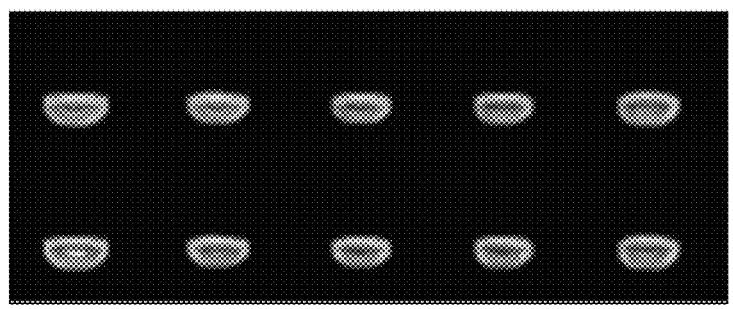
FIG. 7 is an example masking the mouth section of a sequential set of 1st stage input frames in the upper row and the mouth section of a sequential set of 1st stage synthetic output frames in the lower row.

Some embodiments include a generator that outputs frames at higher resolution in comparison to the necessary resolution for the discriminators. The present invention trains the discriminators on images where facial landmarks have been identified and then used to mask out all but the jaw and mouth, including teeth and lips, to train the generator to improve the outputs on just those facial features. During training, the present invention runs facial landmark analysis on the ground truth inputs and the synthetic outputs (see FIG. 5). The system then masks the jaw on the synthetic outputs and on the ground truth frames (see FIG. 6). In addition, the system masks the mouth on the synthetic outputs and the ground truth frames (see FIG. 7). During training, loss functions based on the facial landmarks of the jaw and mouth between the outputs and the ground truths are used to identify facial landmark loss. The facial landmark loss is backpropagated to the generator and the generator continues to adjust the facial landmarks around the jaw and mouth, but focuses very little on the rest of the face. Training the generator in this manner ensures that during inference, the generator will produce high quality jaw and mouth reanimation.

Operating at Beyond 25 FPS

In some embodiments of the present invention, $2^{nd}$ stage GAN 200 is configured to increase FPS. The $2^{nd}$ stage GAN is specifically configured to increase the FPS of the output 106 from $1^{st}$ stage generator 108 using a trained system like a frame interpolation GAN such as FREGAN. The $2^{nd}$ stage synthetic image output 206 by the second-stage generator 208 is then compared to the original image. The output of the second-stage synthetic image 208 has been shown to have significant unexpected quality improvements in comparison to using multiple GANs in succession in which the original image or a modified (e.g., resized) version of the original image was used as the input image. In some embodiments, the $2^{nd}$ stage synthetic image output 206 by may proceed through frame interpolation, standard upscaling (e.g., 25FPS to 60FPS), and/or dynamic upscaling (e.g., any FPS to any higher FPS).

The FPS issue can also be overcome during production-ready inference by downscaling FPS of the cropped-aligned input frames to the required FPS for $1^{st}$ stage generator 108 before inference and then upscaling FPS directly on synthetic outputs 106 before any other post-processing. This doesn't require any GAN changes or updates, this change is pre and post-processing. The FPS of the GAN stays the same (25FPS) but can now ingest 29.97/30/60 FPS during inference.

More specifically, the original video could have an FPS that is greater than the FPS on which $1^{st}$ stage generator 108 is configured to handle. Yet, $1^{st}$ stage generator 108 requires a set FPS to match input audio 102. Thus, the original input frames are run trajectory analysis, in which the target faces are cropped and aligned across frames and cropped again based on facial landmarks detected in the aligned target faces. These cropped frames are downscaled the reduce the FPS using any known methods including cutting out a certain number of equidistantly spaced frames. These downscaled frames are input frames 104 and are run through $1^{st}$ stage generator 108. Synthetic output frames 106 are at 25 FPS. Rather than upscale the final manipulated video, which would produce upscaling artifacts, the present invention upscales synthetic output frames 106 to the original FPS of the original video. The upscaling can be performed using any known methods, including creating synthetic frames via blending of adjacent frames. The upscaled synthetic output frames are sent to $2^{nd}$ stage generator 208. The resulting final product is free of the upscaling artifacts on account of $2^{nd}$ stage generator 208.

Speaker Source Separation

The present invention solves this failure by performing speaker source separation pre-processing during inference. The inference audio may undergo speaker source separation using for example AI systems designed to separate vocals into different audio files to find and remove all speakers except the one that is represented in the video. The result of speaker source separation during pre-processing of training data may undergo a manual check to see if the output speaker matches the video identity. The result of speaker source separation during pre-processing of training data may undergo an automatic check using a lip-sync assessment network like SyncNet, ASDNet, or SimCLR or a process built on top of facial landmark analysis in subsequent frames to see if the output speaker matches the video identity. Both an automatic and then a manual process may be performed.

Reducing Background Noise

The present invention solves this failure by performing background noise removal pre-processing. The training and inference audio may undergo background noise removal. Background noise removal may be performed after speaker source separation, before speaker source separation, or as part of speaker source separation.

Background noise removal may be performed using any known system and methods configured to filter out background noise. Non-limiting examples include Wave-U-Net, Open-Unmix, D3Net, Conv-Tasnet, Demucs, and KUIELAB-MDX-Net.

Normalizing Vocal Volume

The present invention solves this failure by normalizing vocal inputs in audio input 102 to a certain value/range such as average decibel (rms) of ~12 during training and inference. The normalization of vocal inputs may be performed using any known system and methods configured to alter the volume of vocal inputs. Non-limiting examples include compressors.

Reducing Artifacts

The present invention solves this failure by introducing augmentation to better train the GAN. The prior art introduces augmentation on the original image prior to inputting the original image into the generator. This approach however trains the system on a modified original image rather than the actual image which can result in artifacts and other errors. In contrast, the present invention also performs the augmentation on the generated output image ("synthetic image") before it goes to discriminator. The present invention randomly augments based on user defined parameters for the different types of augmentation. Alternatively, the present invention can use computer vision systems programed to make random augments. The types and parameters are controlled by the computer vision augmenter.

Augmentation includes but is not limited to rotating the image, translating the image in the XY plane, skewing the image, changing the colors/jitter of the image, changing the color jitter of the image in HSV, changing the brightness and contrast values of the image. More advanced augmentation includes but is not limited to adding in video modifications such as simulated smoke and unique facial conditions using landmarks. Color-data-augmentation helps with off-colored lips, random weird colored spots, general discoloration, turns lips into teeth, and turns teeth into lips.

The present invention also aligns the same faces and adds increased padding during facial alignment to all training data in order to reduce artifacts. For example, consider an image where the chin is cutoff in the image after the image is cropped and aligned, the chin needs to be added in through padding. Cropping the image without padding doesn't fix cut-off chin. At the very least, you must add padding to the bottom to include the chin. If you include bottom padding alone, the mouth will be out of alignment and the network will produce bad results. Thus, the present invention adds padding to the bottom and the top in amounts proportional to the size of the image and location of the features. For example, if the height is 400 pixels, the mouth is ⅓ of the way through, the present invention adds 10%*(⅓ *3)*400 to the bottom and 10%*(⅔ *3)*400 to the top. Then, the results may work without a cut-off chin. This is an inferior method to crop, align, pad.

Alignment of the Target Face

The present invention overcomes this issue by training and running inference on image data with the target face aligned/oriented in the same manner. The present invention aligns all input frames of the video based on landmark analysis. The steps can be aided through trajectory analysis to track the same face through the frames of the video and smoothing the facial landmarks between frames of the input data. This is a solution that is clearly absent from prior art that made a significant improvement in terms of performance on imperfectly aligned inference data. The present invention also uses more accurate facial landmark detection with more landmarks (e.g., 468 pt), instead of just 68 pts or just a bounding-box detector.

Maintaining Visual Identity

The present invention overcomes this failure by running the input images and/or outputs from the generator through facial recognition and/or facial similarity model like VGG-Face, FaceNet, Facenet512, OpenFace, DeepFace, DeepID, ArcFace, Dlib, etc. (this is an example of meta-information, discussed in more detail below).

Some embodiments of the present invention maintain visual identity without modifying the architecture of the GAN. To do so, the present invention compares perceptual loss and/or prediction loss on the input and output data. These losses can be used to update the weights of the GAN. Perceptual loss is calculated by comparing the perceptual layer(s) for the network(s) of the input image and generator output based on Euclidean distance, cosine distance, Manhattan distance, etc. Prediction loss is calculated by comparing the "final output" prediction based on a distance (Euclidean distance, cosine distance, Manhattan distance, etc.) or accuracy.

The techniques described above to fix general failures in not maintaining visual identity may also help alleviate specific failures of not maintaining visual identity. Some embodiments of the present invention maintain visual identity using meta-information. Image/video/audio-based meta-information includes high-level or low-level characteristics of individuals including but not limited to facial similarity, facial recognition, StyleGAN2, and audio/image/video neural networks trained on specific characteristics with labeled/semi-labeled/unlabeled data.

Meta-information may include the race of a depicted individual, including but not limited to general race (e.g., Caucasian, South Asian, etc.), specific race within a general race (Mediterranean, Atlantic, Nordic, East Baltic, Alpine, Dinaric), and contributing races/subraces (e.g., 50% Caucasian 50% South Asian). The contributing races/subraces are not "predictions" of the network that would come through in all meta-information results. This is a specific answer, e.g., 90% sure the answer is 50% Atlantic and 50% Dinaric.

Meta-information may include the age of a depicted individual. May be binary features, such as Old vs. Not-Old or Young vs. Not-Young. May be age ranges, such as 0-18, 18-49, etc. May be a specific number, e.g., 95% sure they are 28 years old—the best answer is 28 years old. Meta-information may also include the gender of a depicted individual.

Detection, identification, and tracking of meta-information can be executed via a trained network. In addition, such systems may be modified or corrected by a user. Moreover, the trained network can be supervised and include labeled training data.

Reducing Choppiness

Some embodiments of the present invention apply special post-processing to improve the results of the generator. Instead of running inference on [0,1,2,3,4], then [5,6,7,8,9], the present invention can vary the frames on which inference in performed. For example, an embodiment can run inference on [0,1,2,3,4] then [1,2,3,4,5] then [2,3,4,5,6] skipping 1, 2, 3, or 4 frames instead of 5. As another example, the present invention can use the middle frame from each frame-set—[*0*,*1*,*2*,3,4], [1,2,*3*,4,5], [2,3,*4*,5,6]. Furthermore, the present invention can blend frames from each frameset to improve the results.

Some embodiments of the present invention apply other post-processing including but not limited to histogram equalization between crops with temporal understanding and frame-interpolation.

GAN Discriminator Improvements

The prior art employs a trained discriminator during GAN training. In some embodiments, the present invention does not use a pre-trained discriminator which makes the system more versatile. The present invention trains the generator until the outputs reach a certain realism threshold, until L1 loss meets a certain threshold, or until the generator has performed a certain threshold number of outputs. Once this criteria have been met, the present invention starts training the discriminator (e.g., a LipSync expert). In some embodiments, the present invention starts training the discriminator when the generator is initiated.

Some embodiments of the present invention include a facial landmark discriminator in training the $1^{st}$ stage and/or the second stage GAN system. The facial loss discrimination includes a loss function based on facial landmarks. This approach may be used with a lip-sync expert/discriminator or may be used instead of using a lip-sync expert/discriminator. The system detects landmarks on the generator outputs and compares those to original landmarks. This comparison can be completed using known methods, including but not limited to Euclidean distance of all landmarks or Euclidean distance of a subset of landmarks, e.g., landmarks for the lips or other metrics on lips (Hu moments, tangent distance, etc.). A discriminator using such a loss function or trained expert will provide the necessary data to the generator during training so that the generator can learn to improve landmark consistencies.

Some embodiments of the present invention use additional loss functions at either the $1^{st}$ or $2^{nd}$ stage. The system may use many other loss functions individually or conjunction to improve results. Non-limiting examples of loss functions include Euclidean distance, Histogram analysis, tangent distance, GAN losses, SSIM, PSNR, LPIPS, etc.

Some embodiments of the present invention augment outputs of the generator while training SyncNet during Wav2Lip fine-tuning. Some embodiments of the present invention train a system based on Contrastive Learning/SIM Similarity/SimCLR-type network. Some non-limiting examples include SimCLR, SimCLR2, BYOL, SwAV, MoCo, PIRL, NPID, SupContrast, and Siamese.

In some embodiments, the present invention uses the SimCLR discriminator or similar network in modifying the architecture of the system or in a non-modifying architecture fashion. In addition, the system may use pre-trained SimCLR or similar network training during GAN training. The system may be trained in a unique way to help with lip-sync accuracy. For example, the system may use contrastive learning to detect lip-sync vs lip-offsync within identities and/or amongst different identities; may send MelSpec as one the images to determine similarity; and/or related embeddings for face vs MelSpecs. This approach can be used to replace SyncNet or can be used in conjunction with SyncNet.

Some embodiments correct for frame number mismatch. During inference, the outputs will often be missing the last 1-4 frames. The present invention can fix this by extending the input audio during inference to generate an additional frameset (e.g., 5 frames). The system then has extra output frames and can trim off the ones from the end that aren't needed.

Some embodiments also help to fix the mode collapse often present with SyncNet. The present invention adds augmentations of the generated outputs before sending to discriminator to help fix mode collapse.

SyncNet outputs do not blend into the original frame well. The present invention includes data augmentation of inputs, such as adding color augmentation of inputs to help the network learn to maintain colors. The present invention also includes data augmentation of generated outputs before passing to the discriminator, such as adding color augmentation of inputs to help the network learn to maintain colors. The system also normalizes histogram/colors of output to match the input.

One-Shot and/or Lip-Reanimation Networks Configured to Achieve Higher-Accuracy, Fuller-Resolution, Greater Robustness Results on Unseen Identities Some embodiments of the present invention include one-shot and/or lip-reanimation networks configured to achieve higher-accuracy, fuller-resolution, greater robustness results on unseen identities in comparison to the prior art one-shot and/or lip-reanimation networks.

Some of the techniques described herein are also discussed above and some of what's discussed above but not discussed here also helps performance of the one-shot and/or lip-reanimation networks of the present invention in general. All techniques are novel in the application of one-shot networks and/or lip-reanimation, often both individually. Some details are enhanced to describe a unique idea that is especially non-obvious in the application of Generative Adversarial Networks.

Some embodiments of the present invention use learning rate schedules. Most networks don't use learning rate schedules by default. The present invention employs reduction learning rates, e.g., every 100,000 steps, which helps greatly in achieving convergence and repeatability. The present invention produces good results faster than the prior art systems.

Some embodiments use cyclical learning rates, which can help a lot in one-shot and/or lip-reanimation networks due to issues with loss functions and convergence/mode collapse Some embodiments of the present invention also use different learning rate schedules for the generators and discriminators. In some embodiments the learning rates between the generators and discriminators have different mins-maxes. For example, the discriminator learning rate is often 5×-50× higher than the generator. This approach helps prevent mode collapse and obtains higher quality results, especially when using pre-trained discriminators.

Some embodiments of the present invention also modify the image/video data via augmentations. Typically, image/video data augmentations are not performed for GANs, especially not to one-shot and/or lip-reanimation networks. However, modify the image/video data via augmentations helps achieve more stable and more robust results. More specifically, the results maintain visual identity, have higher-accuracy and have higher-resolution.

Some of the types of augmentations were already described in previous sections. To reiterate a few, augmentations may include modifications to color jitter, X-Y offset crops by 0%-±5%, and rotation Offset by 0%-±5%.

Some embodiments of the present invention also modify the audio data via augmentations. Audio data augmentations may be performed directly on Waveform or on MelSpec. A non-limiting list of audio augmentations include changing volume, changing pitch, changing speed (must also change the speed of the video, or only modify speed by less than 5%), masking in the time domain, masking in the pitch domain, and other augmentations. These augmentations are performed using any audio processing system configured to execute the particular augmentation. For example, some embodiments use a pitch augmenting audio processing system to alter the pitch of input audio 102. These augmentations are included in the $1^{st}$ stage training dataset 110 to further train $1^{st}$ stage generator 108. Including augmentations in the training dataset has resulted in more robust datasets and ultimately result in a better trained $1^{st}$ stage generator 108.

As previously explained in preceding sections, some embodiments of the present invention augment outputs of the generator before they are run through discriminator. Prior art systems do not perform data augmentation on the generator outputs; however, this approach of the present invention helps to achieve convergence, helps faster convergence, helps more robust results, helps in visual identity, helps achieve higher-quality results, help overall training at higher-resolutions. Some embodiments perform the augmentation at step 0, while others wait until a certain step/time is achieved, or until a certain loss metric is achieved before augmenting the output from the generator.

Some embodiments use a one-shot network for first stage GAN 100 and may use one-shot network for second stage GAN 200 (and beyond), but these networks may each be fine-tuned on inference data—e.g., the identities within the individual title or titles. These are still technically one-shot networks because the systems are not required to train on these identities. In addition, fine-tuning on inference data leads to higher-accuracy and higher-quality outputs, even for one-shot networks Some embodiments of the present invention include skip-connections (aka "residual connections" and "weighted residual connections"). Skip-connections have been used to increase stability and speed to convergence in deeper networks-networks with more layers. However, skip-connections have never been used for one-shot and/or lip-reanimation. Skip-connections help with mode collapse and with vanishing gradient problem.

Re-Insertion

Figure 8:
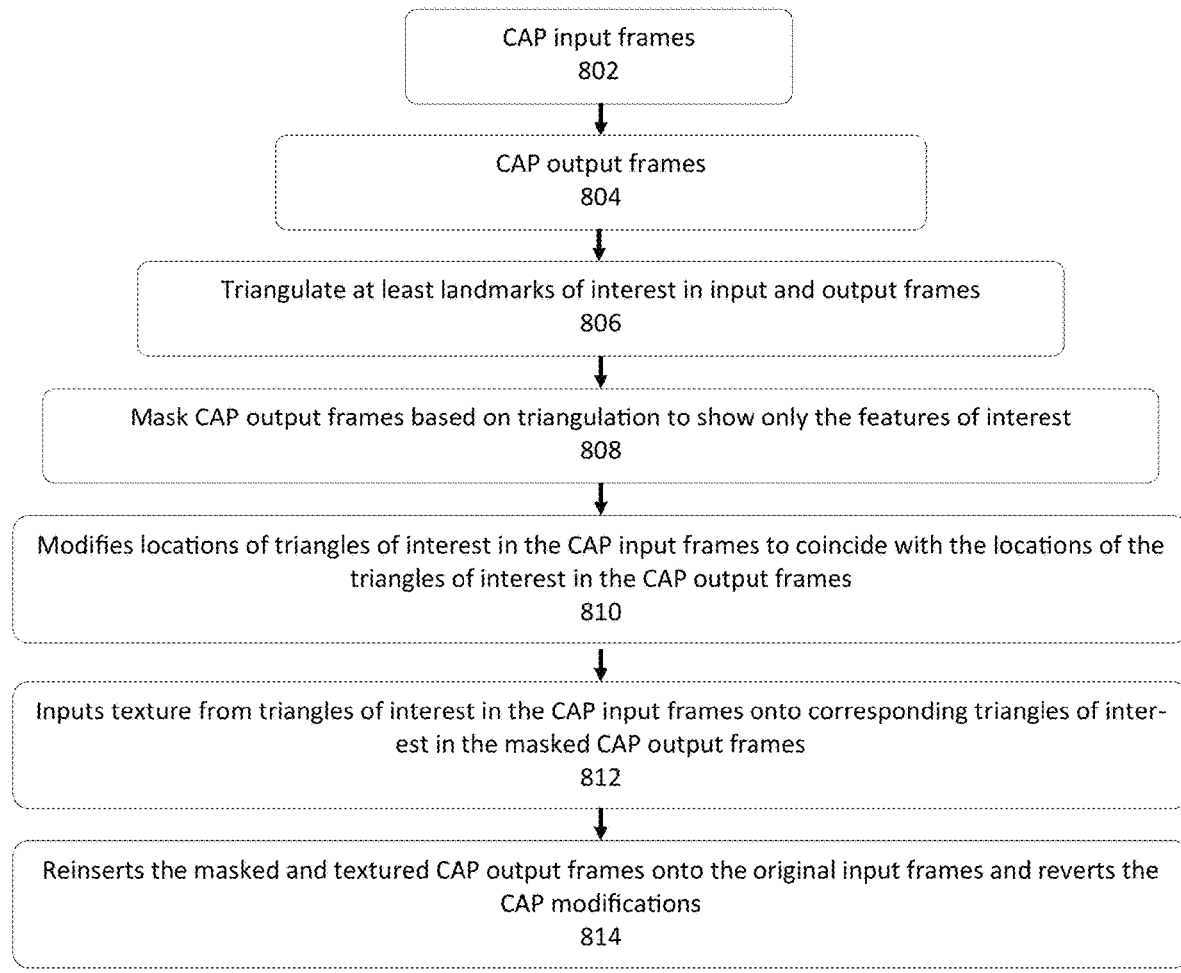
FIG. 8 is a flowchart of an embodiment of the post processing and reinsertion of the 2nd stage synthetic output frames.

Referring now to FIG. 8, some embodiments of the present invention include a method and system(s) to re-insert generated images 206 back into the original frames, in still images and/or videos, to generate more realistic results than capable by the prior art. As previously explained in preceding sections, after synthetic output frames 206 are generated during inference, the synthetic outputs 206 are reinserted into the original frames to reanimate the target face in each frame. However, as captured in step 802, some embodiments of the present invention execute crop, align, and padding steps on each of the input frames 104 to reorient each target face in the same alignment across input frames, detect facial landmarks in the aligned target faces, crop the aligned target faces and adjust the location of the target faces in the cropped frames via padding. In some embodiments input frames 104 are crop-aligned a first time using a larger crop (e.g., FFHQ-align-big) to ensure that the entire face is captured in the crop. Some embodiments execute a subsequent crop-align step (using e.g., FFHQ-align-normal) or just a crop step (using e.g., bounding-box-type) to more tightly crop the aligned frames. The system can also execute facial detection/landmarks again to generate more crops with various paddings to run through the GANs. The tighter crop is useful for improving the resolution of the face, but may also be required to ensure that the frame is correctly formatted to be input into 1$^{st}$ stage GAN 108. The system may also forego this second detection/landmark step and just remove certain amounts of padding from all sides before running through the GANs.

Some embodiments extend the image beyond the pixels that actually exist in order to ensure all faces are aligned in the same way—e.g., a face is already really close up and it needs to move back to match all the other faces. This can be done by edge-extension, e.g., OpenCV pad extend mirror, etc. This can also be done through a specialized "in-painting" based GAN, perhaps using StyleGAN type embedding, which learns to generate these border extensions more realistically.

For any cropping, aligning, and padding ("CAP") actions on the input frames ("CAP-in"), the final GAN outputs frames need to be modified (CAP-out) to recreate the parameters of CAP-in as provided in step 804. For example, an output frame processor 300 (see FIG. 3) reverts the CAP actions back on the synthetic output. If the image is cropped 15% on all sides from a CAP image that originally had 60% padding total to achieve a 30% CAP image as input to the GAN, then the system adds the 15% that was cropped from all sides onto the 30% CAP image to generate a 60% CAP. The system may perform an additional CAP step instead of removing 15% on all sides, e.g., it may run landmark detection and warpTransform the input again/perform GAN-based reconstructions as inputs to a different GAN. Whatever is done has to be undone at some point to get CAP-out. Ultimately, there should be a CAP image of the original input (CAP-in) and a CAP image of the GAN system output (CAP-out) where the only difference is the direct input to the GAN system, e.g., concentric squares.

Some embodiments then create a facial bounding box and identify facial landmarks on CAP-in and CAP-out. The system may run on 68 pt, 468 pt, and/or 2d/3d. However, CAP-in and CAP-out have the same type, e.g., 68 pt CAP-in and 468 pt CAP-out. For the remainder of this section, assume 468 pt 3D landmarks were used. The 468 pt 3D landmarks can be corrected using a user-interface such as a web-app, or VFX editing software like Flame, MochaPro, PowerMesh. It should also be noted that each facial landmark has an identifiable name/value and each facial landmark can be associated with a particular feature of the face. For example, there may be a series of landmarks identified as landmarks 200-250 and each of those landmarks may be identified as landmarks associated with the right eye of the target face. This information is stored for future use in the triangulation and warping steps below.

In some embodiments, the present invention generates Delaunay triangulation for the facial landmarks on CAP-in and CAP-out as provided in step 806. Each triangle includes three vertices in which each vertex is a facial landmark. Based on the identifiable vertices on the identifiable landmarks, each triangle is associate with one of the identified facial features in the target face.

The normal Delaunay triangulation based on closest-pairs may not produce the exact same triangles for CAP-in and CAP-out. Thus, some embodiments generate the triangles for CAP-in first, and then force CAP-out to use those triangles vertices on the CAP-out landmarks. This ensures that the CAP-in and CAP-out triangles match. This isn't important for masking but is vital for remapping.

At step 808, the system then generates a mask based on the Delaunay triangulation to create a masked CAP-out ("CAP-outmasked"). The mask blocks out certain portions of the frames while leaving the areas of interest visible. In some embodiments, the masking steps include inclusion/exclusion of Delaunay triangulation for CAP-out. Inclusion/exclusion allows the system or user to pick specific features of the face, which may include the whole face or only part of a face, such as the "jowl," lips, eyes, and/or nose, etc. For the inclusion/exclusion process, the system or user identifies the features of interest and as a result, the known landmarks and triangles are identified as being included or excluded.

Some embodiments may erode and/or dilate to extend the mask to include certain features such as ears, neck, "double chin," forehead, etc. Some embodiments may blur the mask to reduce sharp edges/borders and make the output much more realistic/blended. Not blurring the mask leads to very poor results. Blurring may be achieved using known blurring computer vision systems that execute steps for blurring the pixels on the border of the mask. For example, some known systems use Gaussian blurring to blend/blur the pixels across the border of the mask. Blurring can be determined as % of face size, e.g., 1% of a face of 762 pixels is a kernel of 8 pixels.

Some embodiments mask the CAP-out onto the CAP-in using this mask to get CAP-outmasked. Regular masking can be performed to produce realistic results with a blurred mask if the GAN system produces outputs that perfectly match the inputs. This approach does not modify the pixel values CAP-out in any way other than the blurry part of the mask.

Some embodiments use Poisson image editing/blending/cloning to blend the masks. Poisson image blending can be executed through known systems, including but not limited to OpenCV seamless_clone. The system can perform normal and/or mixed cloning. Poisson image editing produces much more realistic end results by operating in image "gradients" instead of pixel intensities. The Poisson image blending tries to match the inserted CAP-out image to the original portion in terms of gradients, not necessarily intensities. Poisson image editing also adopts many of the colors, shadows, random effects, and overall "vibes" of the original image. It should be noted that CAP-in and CAP-out must have enough padding such that the generated mask doesn't ever run against the edge of the image, even after dilation and blurring. When performing Poisson image editing, if the mask hits the edge, you get extreme artifacts that present as bright flashes in the final video. Thus, some embodiments will further pad the CAP-in and CAP-out if the mask hits the edge of the cropped frame.

At this point, there is a CAP-in and CAP-outmasked with the only difference in CAP-outmasked being the part of the face that was modified from the generator (not concentric squares) and is not masked. The pixels in CAP-out and CAP-outmasked may match, or they may be different due to masking techniques.

CAP-outmasked will look good, but it still may not be perfect. There may be additional environmental factors in the original image that still weren't transferred properly (smoke, flames, bugs, etc.). Additionally, the modified part of CAP-outmasked will always be subject to maximum limitations of the GAN system. If the GAN system outputs a 2048px image, the final output of GAN-outmasked will have resize-artifacts if the face should end up at 4000px (in 4K/8K video, etc.). These resized artifacts may be noticeable on facial hairs, unsmooth skin, etc.

If the GAN-outmasked went through a GAN-based re-insertion method, that method may be able to solve some of these issues. But even that won't be perfect and will be subject to some type of maximum output size, even when based on patches. As video resolution continues to increase, the GAN system and GAN-insertion must continue to adapt to increases in resolution, unless using an alternative method (described below).

Additionally, GAN-systems based on 2048px and above are exceedingly difficult to create. A system based on a maximum of 512px or 1024px may still achieve perfect realism in 4K and 8K+ with the following method. Some embodiments achieving perfect realism by applying post-processing on CAP-outmasked to create CAP-outmaskedtextured using CAP-in and Delaunay triangulation of landmarks. The system gets the Delaunay triangulation for CAP-in based on landmarks from CAP-in and CAP-outmasked based on landmarks of CAP-out using vertices pairs from CAP-in. The system then creates a set of "triangles of interest." A set of "triangles of interest" correspond to features of interest on the target face, which are typically the features that are reanimated. For example, features of interest may correspond to all the triangles for the left eye up to a radius that includes the eyelid, it could be all the triangles for the top lip, it could all the triangles for the entire face (e.g., all triangles). A set of sets of triangles can be multiple sets, e.g., a set for the top lip and a set for the bottom lip and a set for the left eye and a set for the jowl.

The system then warps/modifies the locations of the triangles of interest in CAP-in based on the location of the triangles of interest in CAP-out and applies texture for each triangle in each set at step 810. This approach includes finding one triangle in CAP-in and the pixel locations of its vertices. The corresponding triangle in CAP-out is identified along with the pixel location of its vertices. Based on the triangle's x-y locations, the CAP-in triangle, and pixels therein, are adjusted to coincide with the x-y locations of the CAP-out triangle. The step of warping the triangles in CAP-in in accomplished by using a Euclidean transformation, affine transformation, homography, inelastic transformation, tangent distance, some GAN-system, etc. to create the warped CAP-in, which is referred to as "CAP-inremappedverta." The re-mapping of the pixels is the alteration of the pixels within the triangle in CAP-in to coincide with the relative position and orientation of the pixels contained within the corresponding triangle in CAP-outmasked.

Then the system copies the "texture" from CAP-inremappedverta on top of the CAP-outmasked at step 812. This can be done through Poisson image editing using texture flattening (e.g., "MIXED_CLONE" flag, some similar system, a linear re-insertion based on masking, or a GAN-based system). Each triangle may be re-mapped in its own way. For example, the triangles corresponding to the lips may be masked in linearly while the triangles corresponding to the inside of the mouth may be masked in using Poisson image editing.

This process may be repeated for every triangle in the set and/or for every set of triangles. Moreover, the system may use blurry mask for each triangle to enhance realistic results.

It should be noted that going "out-to-in" is better than going "in-to-out." In some embodiments, the system starts with triangles from the outer-most region and works in. For example, the system starts on the outside of the jowl/chin, then moves in closer to the lips, then to the lips, then the teeth. As another example, the system starts with the nose set, then the jowl set, then the lip set, then the teeth set. In addition, the system can batch-triangles as well, e.g., do the whole top lip at once, or both lips at once.

This warping works especially well in use-cases where the input and output person are the same, e.g., lip-reanimation, age swap, gender swap, virtual try-on, makeup transfer, etc. Warping may be done in 68 pt and/or 468 pt and may be done with 2D/3D landmarks. It also may be done for face-swap (including special case of one-shot face-swap), makeup transfer, virtual try-on for faces, lip-reanimation, facial modifications, or any GAN-based face system.

At this point in the process, CAP-in and CAP-outmaskedtextured should now be of the exact same quality level. There should be no difference in image or video quality if a person views a video made from CAP-in frames vs a video made from CAP-outmaskedtextured frames. Thus, at step 814, reinsertion module 400 (see FIG. 3) re-inserts CAP-outmaskedtextured back into the full video frame and reverts the CAP operations. Because it can re-insert CAP-in back into the full video frame with no quality loss, it is also able to re-insert CAP-outmaskedtextured with no quality loss/ apparent quality loss even though CAP-outmaskedtextured is based on the outputs of our GAN-system and is fully synthetic.

The process of re-insertion of a CAP-outmaskedtextured frame back into the original full frame includes undoing the CAP operations in the order in which they were performed, undoing affine/homography transformations, which involves reversing the transform matrix M, i.e., performing the CAP operation in reverse. There may be some quality degradation around the edges. However, the system can use a blurred square mask around the whole image to remove this completely. The system can also use a tighter blurred mask (or a tighter unblurred mask) closer to the center of the image, as long as it doesn't remove any of the modified pixels from the CAP-in to CAP-out step.

In some embodiments VFX/Post-Processing may be performed in addition to the steps detailed above or in replacement of one or more steps detailed above. VFX may use CAP-in, CAP-out intermediaries, CAP-out, CAP-outmasked, CAP-outmaskedtextured, the original video frames and the final modified video frames. VFX/Post-Processing may use 468 pt 3D facial landmarks generated for original video frames, final modified video frames, CAP-in, and CAP-out. The landmarks are generated such that they can be easily inserted into/used with modern VFX software. Moreover, landmarks can be used for any related assets, e.g., CAP-out landmarks can be used for CAP-out intermediaries, CAP-outmasked, CAP-outmaskedtextured. Non-limiting examples of VFX software include Flame, MochaPro, PowerMesh, AfterEffect, Photoshop, etc.

Lip-Reanimation Scalability and User-Interface

Some embodiments of the present invention include a method and system for lip-reanimation scalability and also an improved user-interface. The content for the system can be obtained in a number of ways. For example, the content could be existing dubbed content, content that is not dubbed, but could include generated dubbed audio. The content could be uploaded content from user-interface, S3 bucket transfer, from a local-machine, etc. In addition, the content may be given subtitles, PLDL, SRT files or the subtitles, PLDL, SRT files may be generated.

Once the content is obtained, it is parsed. Parsing may include splitting one video into chunks based on subtitles, PLDL, SRT, audio analysis, defined timepoints, etc. The chunks may be processed separately which helps with scaling. Moreover, multiple videos may each have multiple chunks, which further helps with scaling. At some point, the chunks are converted into individual frames.

The system scales up based on input videos and/or chunks. It can handle many (100s, 1000s, 10000s) of videos at once. Scaling may be performed using scalable web service, machine cluster, kubernetes, etc. Some embodiments find facial landmarks in all frames of all chunks and then scales up on a chunk basis and/or a frame basis. Some embodiments first perform trajectory analysis and creates trajectories for target faces. The system then scales up on a chunk basis but may need to wait for nearby chunks to finish processing if they were split based on pre-determined timestamps.

The trajectories may include predictions as to whether the trajectories are "valid" or "invalid." These trajectories predict on a frame-by-frame basis whether the person in the trajectory is speaking using for example, SyncNet, ASD, SimCLR, etc. or facial landmarks, mask, etc. If the same person/target face is speaking, the trajectory is valid. In some embodiments, the first "valid" vs "invalid" is confirmed by the user on a validation screen.

Then, the confirmed "valid" trajectories are processed through the end-to-end system: lip-Reanimation first stage, improving results in a second stage GAN, re-insertion, etc. The system can then scale up—can process many trajectories from same video/different videos at once. By first identifying the invalid trajectories, the system can avoid processing the invalid trajectories, which speeds up end-to-end processing of large videos (e.g., 500GBs) by a tremendous amount.

Moreover, the results from all of these stages are presented to the user on a "framing" screen. The trajectory may come with a frame-by-frame prediction if person is speaking, e.g., a trajectory is 10 seconds long, the person in the frame is speaking from 0-3 and from 6-10. Even if the trajectory includes a prediction, all frames may be run through end-to-end system to make user interface more responsive.

The user confirms which frames contain the target speaker actually talking. In addition, the user can see all outputs (first stage, second stage, masking, textured, etc.). The user can therefore double-check and correct any framing issues, e.g., frames should be included in processing but aren't or vice versa. This does not require a re-run of the entire trajectory through the end-to-end system, but it may require running on some individual frames that weren't processed originally The user can also double-check and can modify input parameters: Meta-information-gender, age, W+, etc. and facial landmarks/aligning/cropping/padding. This will require a re-run through the end-to-end system, but the user sees the effects of the modifications on all output stages. The user can also assess visual quality metrics for each frame using PSRN, SSIM, LPIPS, etc. Some embodiments may include a VFX editing tool that may make use of the 3D facial landmarks to provide additional tools to edit the video frames at any point in processing. The tool may be similar to a VFX tools like Flame, MochaPro, PowerMesh, etc. on web-app, native desktop, mobile app, etc.

Once all trajectories are "validated" and "framed," the video is ready for final processing. Final processing includes stitching all the individual clips back together into one long video, or at least zipping all the individual clips together and sending them to the user. In some embodiments, the system delivers the overall visual quality metrics in the user interface and in a downloadable log file. In addition, output video may be exported in the same resolution/video parameters as the input video Some embodiments include further optimizations: running all operations on GPU gives massive speed improvements; running all frames on lossless image compression leads to the best quality and allows for delivery of the output at the same quality as the input; splitting out facial landmarks, trajectory analysis, different GAN parts, etc. into separate systems/microservices allows us to scale better; pre-loading all machine learning networks including GANs in memory beforehand to optimize speed; freezing all machine learning networks including GANs in memory to optimize inference speed; optimizing inference speed through Torch.jit, scripts, or similar optimizations in machine learning libraries like PyTorch, Tensorflow, Keras, Caffe, etc.; and create C bindings for all pre/post processing and machine learning from python.

Some embodiments include IMF/DCP Integration. The system can run on IMF files but needs frames and audio. The IMF files can be exported but can only modify edited timestamps. Some embodiments, create a new type of IMF xml-instead of just sending timestamps. The system can send timestamps/frame numbers and anchor points (2 (x-y) points) that tell it how to insert the edited frame over the original frames to show the reanimated portion of the face over the corresponding portion of the target face. For example, the system only sends pixel information for the edited or reanimated part of the video. This saves an incredible amount of time, increases speed, and is a brand new type of compression. The final output is an IMF file with a new video track for each dubbed over language.

To explain further, after the reanimation masks are reinserted onto the original frames, the reanimated mouth or lower portion of the face is cropped out. This reanimated crop includes information pertaining to what frame the crop was taken from and what location on the frame. The reanimated crop, frame number, and interframe location is added to an IMF file for the original video to create a modified IMF file. The modified IMF is a much smaller data package and outputs the same result as the fully reanimated video with reanimated lips reinserted into the original video.

In some embodiments, the CAP-outmasked is used to undue/reverse the CAP actions to get the masked synthetic output, which is the modified lower portion of the target face in the correct orientation. The mask file for the masked synthetic output inherently includes the location of the bounding box and thus the x-y locations of the masked synthetic output. These x-y or center points of the bounding boxes corresponding to the x-y locations can be used as the interframe location data for the modified IMF file.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An audio-driven lip reanimation generative adversarial network (GAN) system, comprising:
  a $1^{st}$ stage GAN generator, wherein the $1^{st}$ stage GAN generator is configured to receive $1^{st}$ stage audio inputs and $1^{st}$ stage input frames and is pre-trained to produce $1^{st}$ stage synthetic output frames in which a pair of lips in a target face in the $1^{st}$ stage synthetic output frames has been altered relative to the $1^{st}$ stage input frames based on the $1^{st}$ stage audio inputs; and
  a $2^{nd}$ stage GAN generator, wherein the $2^{nd}$ stage GAN generator is:
   configured to receive the $1^{st}$ stage synthetic output frames as inputs; and pre-trained to generate $2^{nd}$ stage synthetic output frames, wherein training of the $2^{nd}$ stage GAN generator includes calculating one or more separate loss functions for each of a visual quality discriminator, facial identification discriminator, and a temporal consistency discriminator;

whereby the synthetic output frames of the $2^{nd}$ stage GAN generator are improved relative to the $1^{st}$ stage synthetic output frames in visual quality, facial identification, and temporal consistency of the target face across a series of successive frames.

2. The audio-driven lip reanimation GAN system of claim 1, wherein the $1^{st}$ stage GAN generator is pre-trained on $1^{st}$ stage audio inputs and $1^{st}$ stage input frames comprised of a sequential set of modified ground truth frames and a set of unaltered ground truth frames, the modified ground truth input frames including at least a mouth portion of the target face in each frame masked out.

3. The audio-driven lip reanimation GAN system of claim 1, wherein the $1^{st}$ stage GAN generator is pre-trained through backpropagating a calculated loss of at least one $1^{st}$ stage discriminator, wherein the calculated loss is based on a comparison of the $1^{st}$ stage synthetic output frames with the unaltered ground truth frames.

4. The audio-driven lip reanimation GAN system of claim 3, wherein the at least one $1^{st}$ stage discriminator includes:
a facial identification discriminator configured to calculate a loss of facial identification between the target face in the $1^{st}$ stage synthetic output frames and the unaltered ground truth frames based on a facial identification loss function; and
a lip sync discriminator configured to calculate a loss of lip syncing between the target face in the $1^{st}$ stage synthetic output frames and the $1^{st}$ stage audio inputs.

5. The audio-driven lip reanimation GAN system of claim 1, wherein:
the $2^{nd}$ stage GAN generator is pre-trained on $2^{nd}$ stage input frames; and
the $2^{nd}$ stage input frames are comprised of the $1^{st}$ stage synthetic output frames.

6. The audio-driven lip reanimation GAN system of claim 1, wherein the $2^{nd}$ stage GAN generator is pre-trained through backpropagating a calculated loss of at least one $2^{nd}$ stage discriminator, wherein the calculated loss is based on a comparison of the $2^{nd}$ stage synthetic output frames with the unaltered ground truth frames.

7. The audio-driven lip reanimation GAN system of claim 6, wherein the at least one $2^{nd}$ stage discriminator includes:
the facial identification discriminator configured to calculate a loss of facial identification between the target face in the $2^{nd}$ stage synthetic output frames and the unaltered ground truth frames based on a facial identification loss function;
the visual quality discriminator configured to calculate a loss of visual quality between the target face in the $2^{nd}$ stage synthetic output frames and the unaltered ground truth frames based on a visual quality loss function; and
the temporal consistency discriminator configured to calculate a loss of temporal consistency between the target face in the $2^{nd}$ stage synthetic output frames and the unaltered ground truth frames based on a temporal consistency loss function.

8. The audio-driven lip reanimation GAN system of claim 1, wherein the $1^{st}$ stage GAN generator is further pre-trained by:
identifying facial landmarks on the ground truth frames and on the $1^{st}$ stage synthetic output frames, wherein the identified facial landmarks includes facial landmarks around a jaw and a mouth;
masking the ground truth frames and the synthetic output frames to hide the target face except for a jaw portion of the target face and calculating facial landmark loss for the facial landmarks for the jaw;
masking the ground truth frames and the synthetic output frames to hide the target face except for a mouth portion of the target face and calculating facial landmark loss for the facial landmarks for the mouth; and
backpropagating the calculated facial landmark loss for the facial landmarks for the jaw and the calculated facial landmark loss for the facial landmarks for the mouth to the $1^{st}$ stage GAN generator.

9. The audio-driven lip reanimation GAN system of claim 1, wherein:
the input frames are cropped and aligned to bring the target face in each frame into the same orientation and a frame per second rate of the input frames is downscaled from an original frame per second rate after cropped and aligned, but prior to being provided to the $1^{st}$ stage GAN generator; and
the $1^{st}$ stage synthetic output frames are upscaled to the original frame per second rate prior to being input into the $2^{nd}$ stage GAN generator.

10. The audio-driven lip reanimation GAN system of claim 1, wherein the $1^{st}$ stage audio inputs are filtered to separate speakers, remove background noise, and normalize vocal volume.

11. The audio-driven lip reanimation GAN system of claim 1, wherein the $1^{st}$ stage audio inputs for training the $1^{st}$ stage GAN include augmented audio inputs, the augmented audio inputs including the $1^{st}$ stage audio inputs with an altered pitch.

12. The audio-driven lip reanimation GAN system of claim 1, further including an output frame processor, wherein the output frame processor is configured to perform the steps of:
inserting a series of triangles connecting facial landmarks on the $2^{nd}$ stage synthetic output frames;
inserting a series of triangles connecting facial landmarks on the $1^{st}$ stage input frames, wherein each triangle on the $1^{st}$ stage input frames has a corresponding triangle on the $2^{nd}$ stage synthetic output frames comprised of the same facial landmarks;
masking the $2^{nd}$ stage synthetic output frames to include only triangles corresponding to a mouth portion of the $2^{nd}$ stage synthetic output frames;
moving a location of one or more of the series of triangles on the $1^{st}$ stage input frames to coincide with the locations of the corresponding triangles on the masked $2^{nd}$ stage synthetic output frames, wherein a set of pixels within the one or more moved triangles moves with the moved triangle.

13. The audio-driven lip reanimation GAN system of claim 12, wherein the output frame processor further executes the steps of:
inputting texture from the $1^{st}$ stage input frames onto the pixels within the triangles in the masked $2^{nd}$ stage synthetic output frames.

14. The audio-driven lip reanimation GAN system of claim 12, further including a reinsertion module, the reinsertion module configured to reinsert the at least a lower portion of the target face from each of the $2^{nd}$ stage synthetic output frames back into the original input frames.

15. A method of reanimating lips based on an input audio using a generative adversarial network (GAN) system, comprising:
- receiving, by a $1^{st}$ stage GAN generator, $1^{st}$ stage audio inputs and $1^{st}$ stage input frames, wherein the $1^{st}$ stage GAN generator is pre-trained to produce $1^{st}$ stage synthetic output frames based on the $1^{st}$ stage audio inputs, whereby the $1^{st}$ stage synthetic output frames include a pair of altered lips in a target face in the $1^{st}$ stage synthetic output frames relative to the $1^{st}$ stage input frames; and
- receiving, by a $2^{nd}$ stage GAN generator, the $1^{st}$ stage synthetic output frames as inputs, wherein the $2^{nd}$ stage GAN generator is pre-trained to generate $2^{nd}$ stage synthetic output frames, wherein training of the $2^{nd}$ stage GAN generator includes calculating one or more separate loss functions for each of a visual quality discriminator, facial identification discriminator, and a temporal consistency discriminator;
- whereby the synthetic output frames of the $2^{nd}$ stage GAN generator are improved relative to the $1^{st}$ stage synthetic output frames in visual quality, facial identification, and temporal consistency of the target face across a series of successive frames.

16. The method of claim 15, further including training the $1^{st}$ stage GAN generator by:
- inputting $1^{st}$ stage audio inputs and $1^{st}$ stage input frames comprised of a sequential set of modified ground truth frames and a set of unaltered ground truth frames, the modified ground truth input frames including at least a mouth portion of the target face in each frame masked out;
- backpropagating a calculated loss of facial identification between the target face in the $1^{st}$ stage synthetic output frames and the unaltered ground truth frames based on a facial identification loss function; and
- backpropagating a calculated loss of lip syncing between the target face in the $1^{st}$ stage synthetic output frames and the $1^{st}$ stage audio inputs.

17. The method of claim 15, further including training the $2^{nd}$ stage GAN generator by:
- backpropagating a calculated loss of facial identification between the target face in the $2^{nd}$ stage synthetic output frames and the unaltered ground truth frames based on a facial identification loss function;
- backpropagating a calculated loss of visual quality between the target face in the $2^{nd}$ stage synthetic output frames and the unaltered ground truth frames based on a visual quality loss function; and
- backpropagating a calculated loss of temporal consistency between the target face in the $2^{nd}$ stage synthetic output frames and the unaltered ground truth frames based on a temporal consistency loss function.

18. The method of claim 15, further including reinserting at least a lower portion of the target face from each of the $2^{nd}$ stage synthetic output frames back into the original input frames.

* * * * *